(12) United States Patent
Samkhan

(10) Patent No.: US 8,464,531 B2
(45) Date of Patent: Jun. 18, 2013

(54) METHOD AND DEVICE FOR CONVERTING THERMAL ENERGY INTO ELECTRICITY, HIGH POTENTIAL HEAT AND COLD

(75) Inventor: Igor Isaakovich Samkhan, Yaroslavi (RU)

(73) Assignee: Igor Isaakovich Samkhan, Yaroslavi (RU)

( * ) Notice: Subject to any disclaimer, the term of this patent is extended or adjusted under 35 U.S.C. 154(b) by 882 days.

(21) Appl. No.: 12/451,542

(22) PCT Filed: May 18, 2007

(86) PCT No.: PCT/RU2007/000238
§ 371 (c)(1),
(2), (4) Date: Nov. 17, 2009

(87) PCT Pub. No.: WO2008/143542
PCT Pub. Date: Nov. 27, 2008

(65) Prior Publication Data
US 2010/0156110 A1    Jun. 24, 2010

(51) Int. Cl.
*F01K 25/06*    (2006.01)
*F01K 25/08*    (2006.01)

(52) U.S. Cl.
USPC ............... 60/649; 60/651; 60/671; 60/673

(58) Field of Classification Search
USPC ............................. 60/649, 651, 671, 673
See application file for complete search history.

(56) References Cited

U.S. PATENT DOCUMENTS

| | | | |
|---|---|---|---|
| 4,283,211 A * | 8/1981 | Ehrlich et al. ............ | 62/4 |
| 4,347,705 A * | 9/1982 | Mirante .................. | 60/651 |
| 4,729,226 A * | 3/1988 | Rosado .................. | 60/649 |
| 4,918,937 A * | 4/1990 | Fineblum ............... | 62/175 |
| 5,029,444 A | 7/1991 | Kalina | |
| 5,237,839 A | 8/1993 | Dehne | |
| 5,715,682 A | 2/1998 | Nakata | |
| 2005/0086971 A1 | 4/2005 | Wells | |

FOREIGN PATENT DOCUMENTS

| | | |
|---|---|---|
| RU | 2295677 C | 3/2007 |
| SU | 87623 C | 1/1961 |
| SU | 674690 C | 7/1974 |

OTHER PUBLICATIONS

English Language International Search Report dated Apr. 1, 2008 issued in parent Appln. No. PCT/JP2008/053552.
Sokolov E.Ya., Brodyanskiy V.M. Energy-related principles of heat transformation and cooling processes.—Moscow: Energoizdat, 1981,p. 14-66 p. 49.
Badylkes E.S., Danilov R.L. Absorption refrigerating machines.—Moscow: Pishchevaya Promyshlennost (Food Industry) Publishing House, 1966, p. 30-160 p. 131.
Valdimarsson P., Eliasson L., Factors influencing the economics of the Kalina power cycle and situations of superior performance.—International Geothermal Conference, Reykjavik, Sep. 2003. Session #1, p. 32-40.

* cited by examiner

*Primary Examiner* — Hoang Nguyen
(74) *Attorney, Agent, or Firm* — Yefim Kreydin

(57) ABSTRACT

The inventive method for converting thermal energy into electricity, high-potential heat and cold consists in evaporating a coolant from a strong solution at a high temperature and pressure in a boiler in such a way that a superheated vapor and a weak solution thereof are formed, in reducing the temperature and pressure of the coolant and solution associated with the interaction thereof with external consumers (sources) of energy, in absorbing the low-temperature coolant in the weak solution in an absorber, in subsequently compressing the strong solution, which is formed during the absorption, by a pump, in heating said solution in a regenerator and in supplying it to evaporation. Prior to absorption, the weak solution is overcooled in a cooler using low-temperature energy sources. A turbine with a generator or a condenser, a control valve and an evaporator are used as a unit for interacting the coolant with energy consumers. Said invention makes it possible to increase the efficiency of heating, cooling and power energy generation processes.

22 Claims, 2 Drawing Sheets

Figure 1:
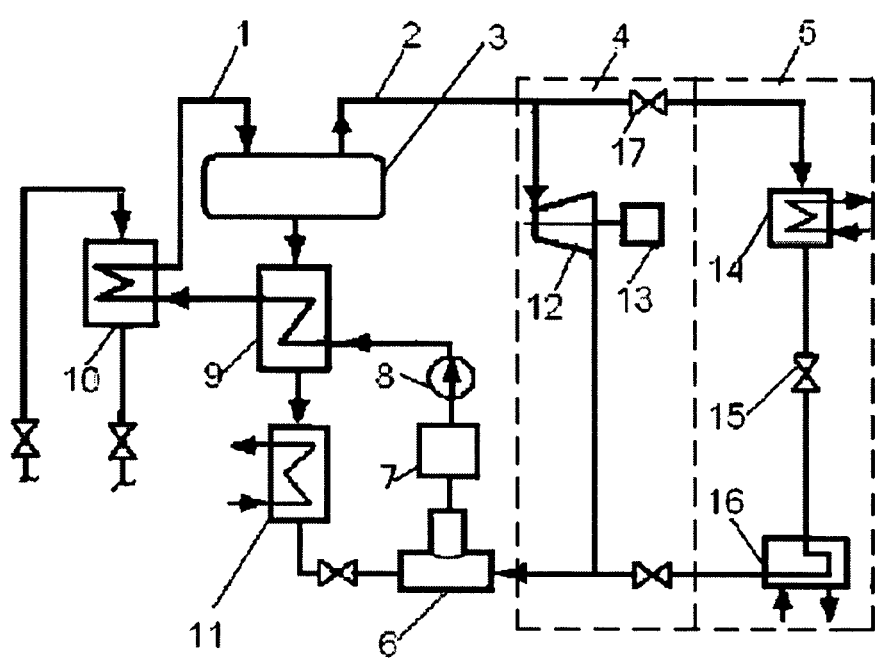

METHOD AND DEVICE FOR CONVERTING THERMAL ENERGY INTO ELECTRICITY, HIGH POTENTIAL HEAT AND COLD

This application is the United States national phase application of International Application PCT/RU2007/000238 filed May 18, 2007, the entire disclosure of which is incorporated herein by reference.

This invention relates generally to the heat-power engineering and, more particularly, to the conversion processes of the thermal energy of relatively low temperature level (potential), and can be used for production of mechanical (electrical) power as well as for heat and cold supply.

Vapor-compression methods of thermal energy conversion (thermotransformation) [1] which include the evaporation of working fluid at a reduced pressure followed by the absorption of thermal energy of a low-temperature source, the compression of the working fluid in the vaporous state through the use of a compressor, the cooling and condensation of the working fluid with the thermal energy released thereby being transferred to a higher-temperature receiver, and a reduction of the working fluid pressure (as a rule, through a throttling) prior to the evaporation are well-known in the art.

Also known is absorption method of thermal energy conversion (thermotransformation) used for the production of cold and/or thermal energy [2]. In this method the refrigerant is evaporated from a liquid solution at an elevated temperature and an increased pressure due to the heat of an external source. The superheated vapor of the refrigerant formed thereby is initially cooled and condensed with the released heat being transferred to external consumers, then the condensed fluid of the refrigerant is throttled and again evaporated at a lowered temperature (reduced pressure), whereas the vapor formed thereby is absorbed in a lean solution at constant pressure which is cooled in the course of absorption. In its turn, the lean solution formed after the evaporation is, prior to carrying out the absorption, also cooled and throttled, while the strong solution is after the absorption compressed, heated and sent for a re-vaporization.

Another method of thermal energy conversion is known [3] which received the name Kalina cycle and is chosen here as an analogue being most similar to the subject invention in cumulative elements of claim (prototype). In this method the absorption principle of thermotransformation is applied to produce (generate) electricity. Besides, in this method one evaporates the refrigerant (working medium) from the strong solution ($NH_3+H_2O$) at an elevated temperature and an increased pressure, lowers the temperature and pressure of the refrigerant with its possible partial condensation owing to the production of mechanical (electrical) power, dissolves (absorbs) the refrigerant vapor in a precooled lean solution at constant pressure with recuperative and/or external cooling of the mixture of vapor of the refrigerant and solution, and pumps over the strong solution into the high-pressure zone for evaporation. In this case the lean solution has only recuperative cooling, whereas the absorption is conducted at constant or decreasing pressure, with no cooling of the solution by external sources prior to mixing with the refrigerant.

Apparatus for thermal energy conversion is known [3] which includes the flow circuits of refrigerant and solution with a separator installed in them, a unit of interaction of the refrigerant with power consumers (IRPC unit), a unit of mixing the refrigerant and the lean solution, a thermal energy regenerator, a boiler connected to the elevated-temperature heat source, and a cooler connected to the lowered-temperature heat source. In this apparatus the IRPC unit represents a turbine connected to the generator, the unit of mixing the refrigerant and the lean solution (absorber) constitutes a system of pipelines in which the flow of vapor and liquid moves with reduction in pressure because of flow resistances, and the cooler is mounted in the section of the circuit for movement of the liquid-vapor mixture.

The object of the subject invention is to provide a new method (cycle) and an apparatus for thermal energy conversion furnishing a means for the cogeneration of heat, cold and electrical (mechanical) power, further enhancement of efficiency of these processes, as well as offering the prospect of widening the scope of utilization of renewable heat sources and reducing the environmental pollution.

The above object is accomplished by the fact that in the method of thermal energy conversion involving the evaporation of the refrigerant (working medium) from its liquid solution at an elevated temperature and an increased pressure, the interaction of the solution and refrigerant with external receivers (sources) of energy, accompanied by a decrease of their temperature and pressure with possible condensation of the refrigerant, the absorption (solution) of the refrigerant in a precooled lean solution at a lowered temperature and reduced pressure, as well as the compression, heating and pumping of the formed strong solution for evaporation, the refrigerant absorption is conducted with the pressure growing as the concentration of the solution increases, whereas the solution prior to mixing with the refrigerant is subcooled using the external heat sources of lowered temperature.

Moreover, special features of the method of the present invention leading to the achievement of the technical result are:
- conducting the absorption of the refrigerant in a jet device by the use of the pressure of the lean solution in order to increase its kinetic energy;
- conducting the absorption via a compressor (for example, a screw or spiral one);
- lowering the temperature and pressure of the refrigerant through expansion of its vapor in a turbine with work being done;
- lowering the temperature and pressure of the refrigerant through its condensation, throttling and re-vaporization at a lowered temperature prior to conducting the absorption;
- additional compression of the refrigerant vapor in the compressor after evaporation and utilization of this vapor as heat source for the evaporation of the solution.

In the apparatus for thermal energy conversion including the flow circuits of refrigerant and solution with a separator installed in them, a unit of interaction of the refrigerant with environment, a mixer (or an absorption device), a pump, a regenerator, a boiler (boiler-heater) and a cooler (heat exchanger), the mixer (absorption device) represents a device for increasing the pressure of the liquid-vapor mixture, whereas the cooler is connected to the solution circuit ahead of the mixer.

Other novel features of the apparatus of the present invention are:
- using as mixer (absorber) a liquid-vapor ejector (injector);
- using as mixer a (screw or spiral) compressor;
- using as IRPC unit a turbine and an electric generator;
- using as IRPC unit a condensor, a regulating valve and an evaporator;
- using as boiler (boiler-heater) a condensor connected to the separator by means of an intermediate compressor and a regulating valve.

The advantages of the method of the present invention stem from the possibility of supercooling the lean solution (brine) prior to conduction of the absorption and a possibility to increase the pressure and temperature of the solution when conducting it. In this case it is allowable to decrease the refrigerant temperature to the values below the environmental level, and as a consequence of that: raising the temperature range of the cycle, its efficiency, and having a possibility to apply this cycle to the production of cold too.

BRIEF DESCRIPTION FOR THE DRAWINGS

Figure 2:
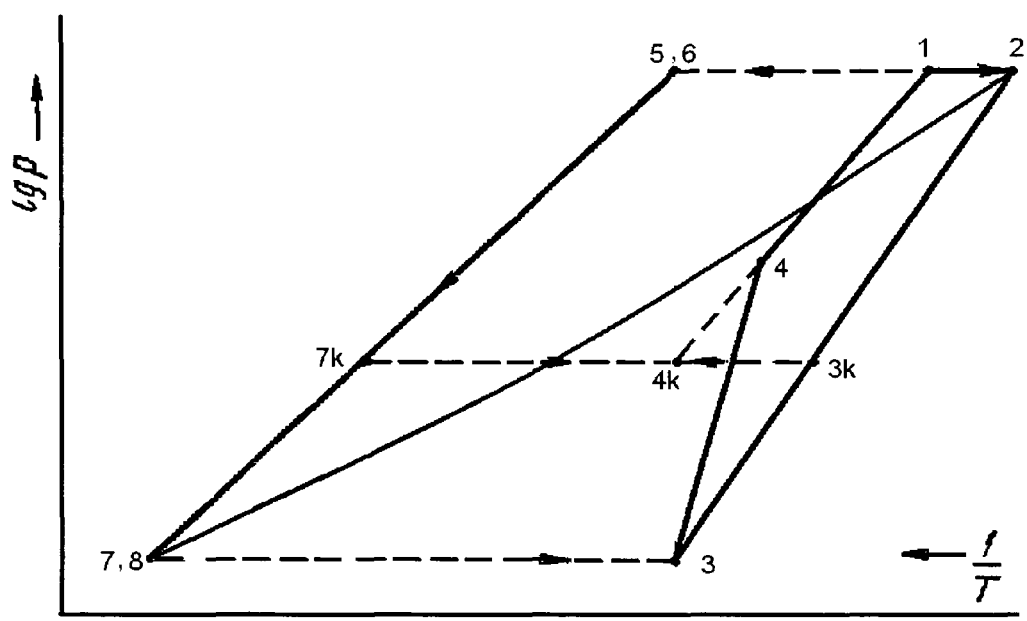

FIG. 1 shows the overall system of this invention.
FIG. 2 shows the T-P diagram of the system.

The essence of the method of the present invention is explained by a schematic of the apparatus for its embodiment shown in FIG. 1, and by a sketch representation of the characteristic processes of this method in a diagram displayed in FIG. 2 with coordinates lg p–(–1/T), where p is pressure, T is absolute temperature.

The apparatus in FIG. 1 comprises a flow circuit of refrigerant 1 and a flow circuit of solution 2 with a separator 3 installed in them, units 4 and 5 of interaction of the refrigerant with power consumers (IRPC units), a mixer (absorber) 6, an additional heat exchanger 7, a pump 8, a regenerator 9, a boiler (boiler-heater) 10, and a cooler (heat exchanger) 11. In its turn the unit 4 includes a turbine 12 and a generator 13, while the unit 5 incorporates a condensor 14, regulating valves 15 and an evaporator 16.

In FIG. 2 the following processes of change in the state of the working medium (refrigerant and solution) are depicted:
1-2—evaporation of the strong solution with the formation of the vapor of refrigerant and lean solution;
2-3—cooling of the lean solution in the regenerator and cooler and reduction of its pressure due to acceleration in a jet device and throttling;
3-4—absorption of the refrigerant with increase in pressure and temperature of the solution and refrigerant;
4-1—compression and recuperative heating of the strong solution;
2-5-6—possible cooling of the refrigerant vapor and its condensation (depicted by the coincident points 5 and 6 of the diagram);
6-7—throttling of the refrigerant;
7-8—evaporation of the refrigerant (depicted by the coincident points);
2-8—possible expansion of the refrigerant with work being done;
8-3—mixing of the refrigerant vapor with the lean solution;
3-4—absorption of the refrigerant in solution when pressure and temperature increase.

The points $3k$, $4k$ and $7k$ of the diagram characterize possible behavior of corresponding processes when applying the prior methods (dashed lines), in which the refrigerant absorption is carried out at practically constant pressure.

The method of the present invention can be implemented using conventional working mediums (solutions) widely employed in absorption heat engines (refrigerating machines) or power units like the Kalina cycle and recuperative (regenerative) engines like the Rankine cycle with a binary (two-component) working medium, such as $NH_3+H_2O$ solutions, R22 Freon and tetraethylene glycol dimethyl ether, abbrev. TEG DME with the chemical formula $CH_3(OCH_2CH_2)_4OCH_3$), as solvent, etc. In a number of cases a mineral or synthetic oil usually applied to the lubrication of refrigeration compressors can be used as absorbent, what ensures an increased difference of temperatures of boiling refrigerant and absorbent.

The method can be applied to the creation of a new generation of conditioners, refrigerating machines, heat pumps and other similar equipment whose efficiency may exceed the currently achieved level by a factor of 1.5 or more.

The method can be applied to the generation of electrical power under stationary or mobile conditions with the use of various heat sources, including the renewable ones and fuel burnt. In this case the lower temperature limits of heat sources of 100 to 120° C. currently allowable for a profitable use with the application of the Rankine and Kalina cycles decline to about 50 to 60° C., whereas the efficiency of thermomechanical conversions in the low temperature region is significantly higher in the new cycle as compared with other prior methods.

The method of the present invention allows for the cogeneration of heat, cold and electrical power with providing the possibility to regulate the produced kinds of energy depending on the season of the year and customer demand, what enables, along with an enhancement of efficiency, the payback period of capital investments to be substantially shortened. The application of the new cycle in various branches of technology makes it possible to significantly enhance the efficiency of energy production, to extend the scope of utilization of secondary or renewable heat sources, as well as to cut down the consumption of burnt fuel and to reduce the environmental pollution.

REFERENCES CITED

1. Sokolov E. Ya., Brodyanskiy V. M. Energy-related principles of heat transformation and cooling processes.—Moscow: Energoizdat, 1981, p. 14-66.
2. Badylkes E. S., Danilov R. L. Absorption refrigerating machines.—Moscow: Pishchevaya Promyshlennost (Food Industry) Publishing House, 1966, p. 30-160.
3. Valdimarsson P., Eliasson L., Factors influencing the economics of the Kalina power cycle and situations of superior performance.—International Geothermal Conference, Reykjavik, September 2003. Session #1, p. 32-40.

The invention claimed is:

1. A method of converting thermal energy into electricity, greater-potential heat and cold comprising:
    evaporation of refrigerant from a strong solution at elevated temperature and increased pressure with the formation of a flow of refrigerant vapor and a flow of lean solution,
    lowering the temperature and pressure of the refrigerant vapor through its expansion with work being done and
    lowering the temperature and pressure of the refrigerant vapor through its cooling and condensation when thermal energy is released, with subsequent throttling of the liquid refrigerant and its evaporation at reduced pressure with the formation of refrigeration effect;
    absorption of the reduced-pressure refrigerant vapor in the lean solution proceeding with the release of thermal energy and the formation of a strong solution,
    cooling the lean solution after evaporation, heating the strong solution formed during the absorption, as well as
    increasing the pressure of the solution,
    wherein in the course of absorption, the pressure of the lean solution is raised according as its temperature increases because of heat emission in this process.

2. The method as defined in claim 1 wherein the refrigerant vapor after evaporation is separated into two flows, one of which is used for expansion with work being done, while the other is employed to produce cold.

3. The method as defined in claim 1 wherein the refrigerant vapor, when work being done, is expanded to the temperature below the least temperature of the solution followed by absorption of the vapor in the lean solution.

4. The method as defined in claim 1 wherein the lean solution, prior to the absorption, is cooled with the greater-potential heat being transferred to an external heat carrier.

5. A method of converting thermal energy into electricity, greater-potential heat and cold involving:
  formation of a flow of refrigerant vapor and a flow of lean solution at elevated temperature and increased pressure from a strong solution,
  lowering the temperature and pressure of the refrigerant vapor through its expansion with transforming its energy into usable forms and producing a spent vapor flow,
  absorption of the reduced-pressure refrigerant vapor in the lean solution proceeding with the release of thermal energy and the formation of a strong solution,
  cooling the lean solution, heating the strong solution formed during the absorption, as well as
  increasing the pressure of the solution,
  wherein the refrigerant vapor, when work being done, is expanded to the temperature of the lean solution directly before absorption with subsequent absorbing the vapor in the lean solution.

6. The method as defined in claim 5
  wherein in a course of absorption, the pressure of the lean solution is raised according as its temperature increases because of heat emission in this process.

7. The method as defined in claim 5 wherein the lean solution, prior to the absorption, is cooled with the greater-potential heat being transferred to an external heat carrier.

8. The method as defined in claim 6 wherein the lean solution, prior to the absorption, is cooled with the greater-potential heat being transferred to an external heat carrier.

9. An apparatus for converting thermal energy into electricity, greater-potential heat and cold comprising:
  a boiler with a separator for evaporation of a refrigerant and its separation from a solution;
  a heat engine connected to the separator with conveying pipelines for feeding a refrigerant vapor and
  a condenser with conveying means for feeding into the condenser the vapor and for removing from it the liquid refrigerant to an evaporator with an expansion valve,
  an absorber with conveying means for feeding into the absorber the refrigerant vapor and a lean solution, and with conveying means for delivering a strong solution from the absorber into the boiler,
  a pump for increasing a pressure and a circulation of the solution,
  a regenerative heat exchanger and a cooler,
wherein the cooler has external cooling, is installed between the separator and the absorber in order to ensure the heating of the external heat carrier and a decrease in the temperature of the lean solution ahead of the absorber.

10. The apparatus as defined in claim 9 wherein the heat engine is connected to the separator in parallel with the condenser with a possibility of distributing the vapor flows to the engine and the condenser by means of a regulating valve.

11. The apparatus as defined in claim 9 wherein the heat engine is equipped with conveying means for feeding the spent vapor into the absorber.

12. The apparatus as defined in claim 10 wherein the heat engine is equipped with conveying means for feeding the spent vapor into the absorber.

13. The apparatus as defined in claim 9 wherein the absorber represents a liquid-vapor jet device providing a decrease in the vapor pressure ahead of the absorber and an increase in the solution pressure in the course of absorption.

14. The apparatus as defined in claim 10 wherein the absorber represents a liquid-vapor jet device providing a decrease in the vapor pressure ahead of the absorber and an increase in the solution pressure in the course of absorption.

15. The apparatus as defined in claim 9 wherein a compressor is used as absorber.

16. A method of converting thermal energy into electricity, greater-potential heat and cold involving:
  formation of a flow of refrigerant vapor and a flow of lean solution at elevated temperature and increased pressure from a strong solution,
  lowering the temperature and pressure of the refrigerant vapor through its expansion with transforming its energy into usable forms and producing a spent vapor flow,
  absorption of the reduced-pressure refrigerant vapor in the lean solution proceeding with release of thermal energy and the formation of the strong solution,
  cooling the lean solution, heating the strong solution formed during the absorption, as well as
  increasing the pressure of the solution,
  wherein the lean solution, prior to the absorption, is cooled with the greater-potential heat being transferred to an external heat carrier.

17. The method as defined in claim 16 wherein in the course of absorption, the pressure of the lean solution is raised according as its temperature increases because of heat emission in this process.

18. The method as defined in claim 17 wherein the refrigerant vapor, when work being done, is expanded to the temperature of the lean solution directly before absorption with subsequent absorbing the vapor in the lean solution.

19. An apparatus for converting thermal energy into electricity, greater-potential heat and cold comprising:
  a boiler with a separator for evaporation of a refrigerant and its separation from a solution;
  a heat engine connected to the separator with conveying means and pipelines for feeding the refrigerant vapor,
  a condenser with conveying means for feeding into the condenser the vapor and for removing from it the liquid refrigerant to an evaporator with an expansion regulating valve,
  an absorber with conveying means for feeding into the absorber the refrigerant vapor and the lean solution, and for delivering the strong solution from the absorber into the boiler,
  a pump for increasing a pressure and a circulation of the solution,
  a regenerative heat exchanger and a cooler, wherein the cooler has external cooling, is installed between the separator and the absorber in order to ensure the heating of the external heat carrier and a decrease in the temperature of the lean solution ahead of the absorber.

20. The apparatus as defined in claim 19 wherein the heat engine is equipped with conveying means for feeding the spent vapor into the absorber.

21. The apparatus as defined in claim 20 wherein the absorber represents a liquid-vapor jet device providing a decrease in the vapor pressure ahead of the absorber and an increase in the solution pressure in the course of absorption.

22. The apparatus as defined in claim 20 wherein a compressor is used as absorber.

* * * * *